Aug. 7, 1945.   J. R. HOTCHKIN   2,381,352
SELF-LOCKING NUT
Filed Jan. 31, 1944

INVENTOR
James Rowland Hotchkin
BY
Ramsey, Kent + Chisholm
his ATTORNEYS

Patented Aug. 7, 1945

2,381,352

UNITED STATES PATENT OFFICE 2,381,352

SELF-LOCKING NUT

James Rowland Hotchkin, Short Hills, N. J., assignor to The Palnut Company, Irvington, N. J., a corporation of New Jersey Application January 31, 1944, Serial No. 520,480

2 Claims. (Cl. 151—14)

This invention relates to improvements in lock nuts and more particularly to improvements providing a lock nut with dual thread engagement.

An object of the invention is to provide a lock nut of such construction as to incorporate therein spaced-apart thread engaging formations with the engagement at one or more locations being of a resilient nature.

Another object of the invention is to provide a lock nut of hollow shell-like character apertured for the passage of a bolt and having primary thread engaging formations spaced from resilient bolt engaging formations.

Another object of the invention is to provide a lock nut having a shell of generally acorn shape with apertures both in the top and bottom of the shell for the passage of a bolt, such apertures defining thread engaging formations, the formations in the top of the nut being of a resilient nature.

A further object of the invention is to provide a lock nut as before described in which the side walls and dome-shaped top are composed of petal-like formations, the ends of such formations being curled or rolled inwardly, i. e., toward the interior of the nut, and then curled outwardly within the body of the nut to provide a resiliently enlargeable aperture in the top of the nut.

A still further object of the invention is to provide a lock nut of the foregoing character in which means adjacent to the bottom of the shell for engaging and following bolt threads may be provided in a variety of ways, including a single convolution of female thread formed from the metal of the shell bottom, an internally-threaded tubular neck integral with the metal of the shell bottom, and a conventional nut held captive in the lower part of the shell.

In carrying out the foregoing and other objects of the invention a lock nut in the preferred form is constructed entirely from sheet metal of suitable thickness. The nut is blanked out of a strip of metal in the manner shown in my U. S. Letters Patent No. 2,288,710, issued July 7, 1942, for "Cap nut," such blank having a central aperture, the boundary portion of which is shaped for stamping into a yielding thread engaging edge or edges. The blank is provided with a plurality of petal-like formations adapted to be bent upwardly and toward the axis of the nut to bring edges of the adjacent petals into contact, thereby forming the side walls and top of a shell of generally acorn shape. Unlike the structure of my patent above identified, the present construction provides an aperture in the top of the shell by curling the end portion of each petal-like formation inwardly, i. e., toward the interior of the shell, and then radially outwardly, i. e., away from the axis of the shell. This produces a polygonal aperture defined by a plurality of horizontally substantially straight, but vertically curved, surfaces, the number of such surfaces conforming to the number of petal-like formations. This aperture is so dimensioned relative to the aperture in the base of the nut as to cause resilient engagement between the top aperture-defining surfaces and a bolt threadedly engaged with the edge or edges of the base aperture. The material surrounding the base aperture may be in various forms, such as fingers at succesively higher levels to constitute a thread following helix, a wall interrupted by a single slot and also deformed to constitute a thread following helix, or an upwardly extending, internally threaded neck. Also the invention contemplates the use of a conventional nut resting on the base and held captive in the bottom of the shell by the side walls and curved top of the shell.

Further objects, and objects relating to details and economies of construction, operation and use will more definitely appear from the detailed description to follow. My invention is clearly defined in the appended claims.

The best forms for which I have contemplated applying my invention are illustrated in the accompanying drawing forming a part of this specification, in which.

Figure 1:
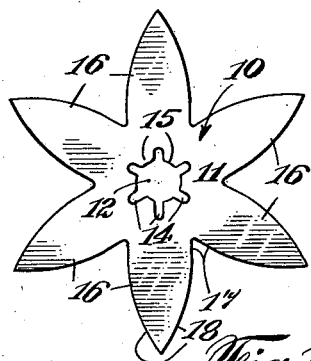
Figure 1 is a plan view of a blank cut from sheet metal, to be formed into a lock nut embodying the present invention.

Referring to the drawing, and first to Figure 1, 10 indicates generally a blank stamped or otherwise cut from sheet metal of a suitable thickness such blank having a body or base portion 11 provided with a central aperture 12, the edge of which has a plurality of slots or channels 14 cut therein. Channels 14 are of graduated depth as shown so that it is possible to distort the fingers 15 into the necessary shape and position for engaging the threads of a bolt. Extending outwardly from the base portion 11 are a plurality of petal-like formations 16, each of which has opposite short edges 17 in substantial parallelism, such edges 17 extending outwardly a short distance from the root of the formation and merging into tapered edges 18 terminating at a point.

Figure 2:
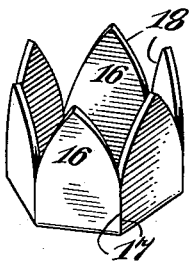
Figure 2 is a perspective view of the blank following additional processing thereof.
Figure 3:
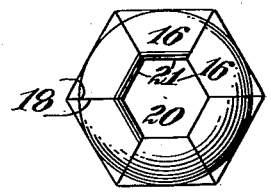
Figure 3 is a top plan view of a completed lock nut.
Figure 4:
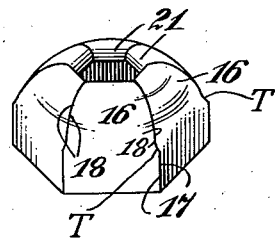
Figure 4 is a perspective view of the nut shown in Figure 3.
Figure 5:
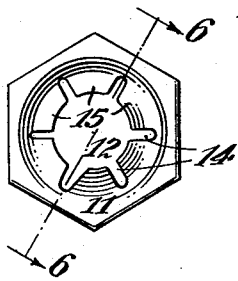
Figure 5 is a bottom view of the completed lock nut shown in Figures 3 and 4.

After a blank has been stamped in the form shown it is further processed (as by stamping) to assume the shape shown in Figure 2 in which the short edges 17 of adjacent petal-like formations are in contact. During this same operation the fingers 15 can be distorted to assume the form and positions shown in Figure 6, the configuration being designed for ready thread engagement. Then, by any suitable mechanism, the portions of the petal-like formations that are spaced in Figure 2, are forced toward the axis of the shell and rounded, while the tips of these formations are curled inwardly of the shell and then radially outwardly thereof as at 19 in Figure 6. The result is to place adjacent tapered edges 18 in contact; and preferably the portion of the shell above edges 17 is stamped to substantially the shape of an apertured hemisphere, the zone 25 having substantially spherical curvature. The aperture 20 in the top of the shell thus formed is defined by a plurality of surfaces 21 which are substantially straight horizontally but are axially curved, i. e., curved in their line of intersection with a plane in which the axis of the nut lies. The space between diametrically opposite surfaces 21 is so dimensioned as to be less than the outside diameter of the threads of a bolt engaged by fingers 15 of the nut. In the finished nut these fingers 15 are disposed upwardly within the shell and the inner edges of the fingers lie along a helix from the lowermost finger to the uppermost finger; the helix corresponding to the pitch of the thread of a bolt with which the nut is to be associated.

The nut made in the manner above described resembles an apertured acorn or shell, having a base aperture and a top aperture and having flat wrench-engaging surfaces defined by the contacting edges 17 of petal-like formations 16. The nut is made of any desired metal having the necessary resiliency for the desired purposes. For some uses, it is desirable that the nut have high electrical conductivity; and in such cases I may make it of phosphor bronze, springy brass, or the like. For other uses steel is a desirable material and I form the nut from soft steel having a composition permitting tempering. After the nut has been formed, I heat treat it to produce the desired degree of hardness and resiliency.

In use a bolt is threaded through the base of the nut into the interior thereof with fingers 15 engaging and following the bolt threads. Continued relative rotation between the nut and the bolt results in the bolt passing through top aperture 20, and due to the dimensions of this aperture the surfaces 21 are pushed outwardly, or the aperture enlarged, against the resiliency of formations 16. Such resiliency causes each surface 21 to engage either one or two thread apices with such pressure as to retain the nut at any desired position on a bolt even prior to contact of the base of the nut with any other object through which the bolt passes. Of course when the nut is tightened against such object the spring fingers 15 perform their usual locking functions. By reducing the size of aperture 20 and making portions 16 of sufficient strength and resiliency, it is possible to cause such strong contact between surfaces 21 and the bolt threads as to require a wrench in turning the nut relative to the bolt. Since each surface 21 is vertically curved, mutilation of bolt threads in the manner caused by sharp edges is substantially eliminated. While the surfaces 21 have been shown in common cross-axial planes so that while one surface is engaging a thread apex, another may be spanning two thread apices, it will be apparent that these surfaces 21 may be arranged at progressive levels (in the manner of fingers 15) so that each surface 21 spans two thread apices.

Figure 6:
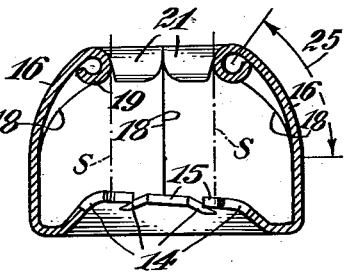
Figure 6 is an enlarged central vertical section taken substantially on the line 6—6 of Figure 5, but showing the nut in upright position.

If desired the base of the nut of this invention can be formed as shown in Figure 6 of my Patent 2,288,710, in which only a single slot extends outwardly from the base aperture and the edge of the aperture follows a helix which has substantially the same pitch as the thread of the bolt with which it is to be used.

Figure 7:
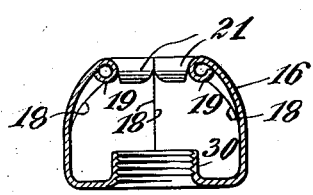
Figure 7 is a central vertical section through a modified nut embodying the invention.

In the modification of the invention shown in Figure 7 there is a drawn metal neck 30 formed integrally with the base of the nut. This neck is internally threaded to engage bolt threads in the usual manner. The upper portion of the nut is identical with that previously described, as is indicated by the reference characters carried over from Figures 1 through 6, and the locking action of the top aperture is unchanged.

Figure 8:
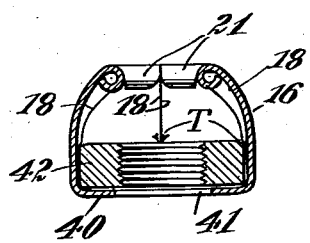
Figure 8 is a central vertical section through another modified form of nut embodying the invention.

In the form shown in Figure 8 there is a flat base portion 40 provided with a relatively large aperture 41. Held captive within the shell of the nut and disposed within the wrench engaging flats or the side walls is a conventional hexagonal nut 42. This nut 42 cannot rotate relative to the shell and it is restrained against appreciable upward movement within the shell by the inwardly curved parts of petal-like formations 16. Nut 42 therefore replaces fingers 15 or neck 30, while the remainder of the lock nut of this figure, and particularly surfaces 21, have the functions before described. In making the nut of Figure 8, the blank is brought to a stage such as shown in Figure 2; then hexagonal nut 42 is dropped in, after which the upper portion of the nut is completed.

From the foregoing it will be seen that the present invention in all forms shown and described provides a new and efficient lock nut which can be made in shell form from sheet metal. A nut so made has thread engaging and following formation or formations adjacent to the bottom thereof which can be integral with the base or even initially separate therefrom but held captive in the finished article. The nut also has wrench engaging flat side walls or surfaces and a domed top which is in effect split along a plurality of lines, due to the petal-like formations employed. This top has a polygonal aperture centrally thereof with the curled edges or surfaces defining the aperture being separable as permitted by the resiliency of the petal-like formations. These curled edges or surfaces when properly dimensioned can so grip the threads of a bolt passing through the shell as to require considerable force to turn the nut relative to the bolt. The thread engagement with the nut in the bottom of the shell can be of a locking character or not as desired. This nut may be used repeatedly on the same bolt without mutilating bolt threads, due to the curved thread-engaging surfaces described herein.

I claim:

1. A self-locking nut comprising: a shell having an apertured base, petal-like formations bent to form side walls and a curved top; and means adjacent to the bottom of said shell for engaging and following bolt threads; the end portions of said formations being rolled inwardly and radially outwardly within the shell to provide axially curved surfaces constituting the edges of an aperture in said top, said curved surfaces being adapted to resiliently engage the threads of a bolt passing through said shell.

2. A hollow, spring steel nut comprising: an apertured base portion which bears means for mating engagement with the threads of a conventional screw-threaded bolt or the like, a tubular wall upstanding from said base portion for spaced encirclement of such a bolt extended therethrough and having an external form for engagement by a wrench or the like, and a top wall formed as a doomed extension of the upper portion of said tubular wall, said top wall consisting of edgewise-abutting spring-steel segments each terminating in an inwardly rolled edge of greater thickness than the pitch of said bolt thread, said terminal rolled edges jointly defining an elastically expansible top-wall aperture within which a portion of the bolt extended through said nut is snugly frictionally encircled to resist relative rotation of nut and bolt without either mating engagement or marring of the bolt threads by said top wall.

JAMES ROWLAND HOTCHKIN.